No. 661,382. Patented Nov. 6, 1900.
E. A. NOLL.
CHUCK.
(Application filed Mar. 21, 1900.)
(No Model.)
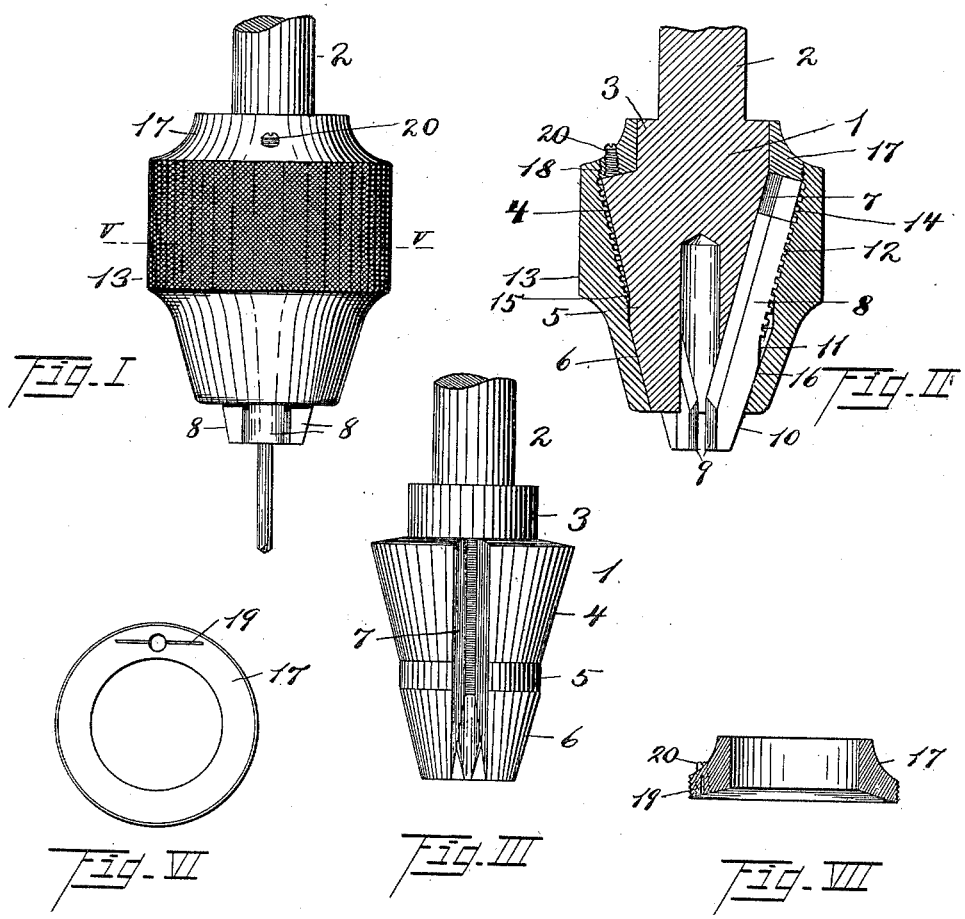
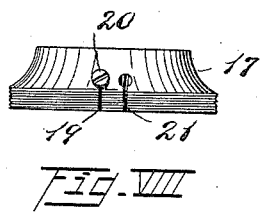

UNITED STATES PATENT OFFICE.

EDWARD A. NOLL, OF CLEVELAND, OHIO.

CHUCK.

SPECIFICATION forming part of Letters Patent No. 661,382, dated November 6, 1900.

Application filed March 21, 1900. Serial No. 9,552. (No model.)

*To all whom it may concern:*

Be it known that I, EDWARD A. NOLL, a citizen of the United States, and a resident of Cleveland, county of Cuyahoga, and State of Ohio, have invented certain new and useful Improvements in Chucks, of which the following is a specification, the principle of the invention being herein explained and the best mode in which I have contemplated applying that principle, so as to distinguish it from other inventions.

The annexed drawings and the following description set forth in detail one mechanical form embodying the invention, such detail construction being but one of various mechanical forms in which the principle of the invention may be used.

In said annexed drawings, Figure I represents a side view of my improved drill-chuck; Fig. II, an axial section of the same; Fig. III, a side view of the core; Fig. IV, an end view of the chuck; Fig. V, a transverse section of the same; Fig. VI, a view of the inner face of the locking-collar in the inner end of the shell; Fig. VII, a sectional view of the same, and Fig. VIII an edge view of the locking-collar provided with another form of spreading and locking device.

The chuck has a core 1, having a shank 2 or other means for securing it to a drill-press or other machine or tool in which a chuck is employed. The core has a cylindrical shoulder 3 and a large truncate-conical portion 4, which terminates in a cylindrical neck 5, from which another truncate-conical portion 6 extends, both cones flaring at the same angle and having consequently their surfaces parallel and interrupted by the step or break formed by the cylindrical neck. Longitudinal grooves 7, having their bottoms parallel with the cone surfaces, are formed at equal distances throughout the length of the core, three being illustrated as most desirable, and correspondingly-shaped jaws 8 slide in said grooves. The outer ends of said jaws are cut off to form tool-clamping inner edges 9, parallel with the axis of the chuck and in the present case beveled at angles of one hundred and twenty degrees, so that they may fit close together when drawn together by the chuck to meet at the axis of the same. The jaws are of the same length as the conical portions of the core and fit completely in the grooves. The outer sides of the jaws are rounded to form continuations of the surfaces of the core and have each a smooth outer portion 10, fitting to the smaller cone, a smooth portion 11, fitting to the neck 5, and a threaded portion 12, projecting above but corresponding to the surface of the larger and inner cone. A shell 13 fits over the core and jaws and has in its interior a screw-threaded larger cone portion 14, engaging the projecting threads of the jaws and fitting upon the large cone portion of the core, a cylindrical portion 15, fitting upon the neck or step of the core and into which the screw-thread merges, as seen in Fig. II at the end of the line from the reference-numeral, and a smooth conical portion 16, fitting upon the small conical portion of the core. A locking-collar 17 fits upon the cylindrical shoulder of the core and is screwed into an internal screw-thread 18 in the end of the shell, closing the inner end of the same and retaining it upon the core. Said locking-collar has a slit or kerf 19 cut into its inner face and partly through the thickness of the collar and extending with its ends to a short distance from the edges of the same, so as to admit of the portion of the collar outside of the slit to be sprung outward to jam the screw-threads and secure the collar in the shell when said slit is expanded. A threaded wedge formed by an outwardly-tapering screw 20 is threaded into a correspondingly-shaped and threaded hole in the collar and intersecting the slit in such manner that the slit may be expanded by drawing the screw toward the contracted end of the hole. The screw is preferably cut with a left-hand thread and inserted from the inner side of the collar and provided with its nick in the narrow outer end, so that the screw may be drawn outward from the outside of the collar and by the left-to-right rotation of the screw usual for tightening a screw. Another form of locking device is illustrated in Fig. VIII, in which the slit 19 is radial and in the threaded edge of the collar and has the tapering screw inserted into its inner portion. This radial slit may be expanded in the same manner by drawing the tapered screw, and for the purpose of providing greater elasticity for expanding the slit and collar another radial slit 21 is formed at the side of the first-mentioned slit, so that the portion of the collar between the slits may be displaced by the tapered screw and the collar be thus expanded and locked.

In practice the chuck may be opened by turning the shell, which preferably is knurled to be turned by hand, and which may have a suitable hole or other means for attaching a wrench or spanner, so as to cause the internal screw-thread of the shell to engage the threads upon the jaws and draw the latter into their grooves in the core. When the drill or other tool is inserted between the open jaws, the latter may be drawn together upon such tool by rotating the shell so as to cause the internal threads of the latter to move the jaws outward, forcing the clamping edges of the same inward against the tool. As the flare of the smaller and outer cones of the core and shell extends beyond and over the flare of the larger and inner cones of the core and shell a distance equal to the height of the teeth or screw-threads upon the jaws said jaws may slide out in their grooves in the core until their clamping edges meet. The cylindrical neck between the cores forms this step between the cone faces. The grooves in the core have straight bottoms parallel with the cone-faces and the sides of the jaws are parallel with the outer faces of the teeth or threads in a line with the smooth outer portions. The jaws may thus be said to have the threads cut into their outer faces and the conical interior of the shell may be said to have the threads formed upon the cone surface and of a height equal to the distance between the cone-lines of the larger and smaller cones of the core, so that the bottoms of the threads are in the same cone plane with the cone surface of the smaller cone.

This chuck is very simple and durable of construction. The cone is simple in form and capable of being quickly and cheaply made. The shell is made in one piece and is consequently simple to make and will not be liable to get out of order or break. The interior of the chuck may be easily reached, as the shell is removable from the end of the chuck without removing the latter from the machine. The locking-collar protects the inner end of the chuck and prevents dust and other obstructions from entering the interior of the chuck. The sides of the jaws are all plane and parallel, so that the jaws may be easily made, and the jaws are completely protected in their grooves and by the shell, excepting so much of their ends as projects beyond the end of the chuck in adjusting them to the drill or tool.

Other modes of applying the principle of my invention may be employed for the mode herein explained. Change may therefore be made as regards the mechanism thus disclosed, provided the principles of construction set forth respectively in the following claims are employed.

I therefore particularly point out and distinctly claim as my invention—

1. In a chuck, the combination of a shell formed with a truncate-conical recess having screw-threads raised from the cone surface of its inner and larger portion, a conical core fitted in said shell and formed with a step or break in its cone surface to fit the inner portion within the threaded portion of the shell and formed with longitudinal grooves in its surface, and jaws fitted to slide in said grooves and within the shell and having threads into the inner portions of their outer sides to be engaged by the threads upon the inner surface of the shell, substantially as set forth.

2. In a chuck, the combination of a core formed with a smaller cone surface at its outer portion and a larger cone surface at its inner portion parallel to said former surface and with a step between said surfaces and having longitudinal grooves in the full length of its surface, a shell fitted upon said core with corresponding internal cone surfaces and step and having the inner cone surface screw-threaded, and jaws fitted to slide in the grooves of the core and having threads in the inner portions of their outer sides to be engaged by the screw-threaded cone surface of the shell, substantially as set forth.

3. In a chuck, the combination of a conical core having longitudinal grooves, a shell fitted upon said core and having an internal screw-thread in its interior cone surface, jaws sliding in the grooves of the core and having threads in their outer sides engaged by the screw-threads of the shell, and a locking-collar fitted to revolve at the inner end of the core and secured in the inner open end of the recess in the shell to close the same, substantially as set forth.

4. In a chuck, the combination of a shell formed with a truncate-conical recess having screw-threads raised from the cone surface of its inner and larger portion, a conical core fitted in said shell and formed with a step or break in its cone surface to fit the inner portion within the threaded portion of the shell and formed with longitudinal grooves in its surface, jaws fitted to slide in said grooves and within the shell and having threads into the inner portions of their outer sides to be engaged by the threads upon the inner surface of the shell, and a locking-collar fitted to revolve at the inner end of the core and secured in the inner open end of the recess in the shell to close the same, substantially as set forth.

5. In a chuck, the combination of a core formed with a smaller cone surface at its outer portion and a larger cone surface at its inner portion parallel to said former surface and with a step between said surfaces and having longitudinal grooves in the full length of its surface, a shell fitted upon said core with corresponding internal cone surfaces and step and having the inner cone surface screw-threaded, jaws fitted to slide in the grooves of the core and having threads in the inner portions of their outer sides to be engaged by the screw-threaded cone surface of the shell, and a locking-collar fitted to revolve at the inner end of the core and secured in the inner open end of the recess in the shell to close the same, substantially as set forth.

6. In a chuck, the combination of a core formed with a cylindrical shoulder at its inner end and with a cone surface at its outer portion and a larger cone surface at its inner portion and with a step between said surfaces and formed with equidistant longitudinal grooves in the full length of its cone surfaces and step, a shell fitted upon said core with corresponding cone surfaces and step and having screw-threads formed in the inner cone surface, jaws fitted to slide in the longitudinal grooves in the core and formed with clamping edges at their outer ends and with threads in the inner portions of their outer sides engaged by the threads of the shell, and a locking-collar screwed into the open inner end of the shell and fitted to turn upon the shoulder of the core, substantially as set forth.

7. In a chuck, the combination with a core, a shell around the same and jaws within the core and shell, of a locking-collar fitted to turn upon the core and screwed into the open end of the shell and formed with a slit, and a tapering screw threaded in a hole intersecting said slit for spreading the same and expanding the collar in the threads of the shell, substantially as set forth.

8. In a chuck, the combination with a core, a shell around the same, and jaws within the core and shell, of a locking-collar fitted to turn upon the core and screwed into the open end of the shell and formed with a slit extending nearly through the thickness of the collar and from near the edge of the same to another point near the edge and with an outwardly-tapering threaded hole intersecting said slit, and a tapering screw in said hole whereby the slit may be spread by drawing the screw outward and the threads of the collar expanded in the threads of the shell, substantially as set forth.

9. In a chuck, the combination of a core having its inner end of a greater diameter than the outer end and having a reduced shoulder at such inner end, a shell fitting around said core and fitted from the outer end of the same, jaws within the core and shell, and a locking-collar fitted to turn upon the reduced shoulder and secured to the inner and larger end of the shell to close the same and retain the shell upon the core, substantially as set forth.

In testimony that I claim the foregoing to be my invention I have hereunto set my hand this 19th day of February, A. D. 1900.

EDWARD A. NOLL.

Witnesses:
 WM. SECHER,
 K. F. WINDING.